Aug. 29, 1961

N. A. MAURER 2,998,313

METHOD AND MEANS FOR PRODUCING ANIMATED CARTOONS

Filed Jan. 17, 1955

INVENTOR.
Norman A. Maurer
BY C. G. Stratton
ATTORNEY

Aug. 29, 1961     N. A. MAURER     2,998,313
METHOD AND MEANS FOR PRODUCING ANIMATED CARTOONS
Filed Jan. 17, 1955     3 Sheets-Sheet 2

INVENTOR.
Norman A. Maurer
BY C. G. Stratton
ATTORNEY

INVENTOR.
Norman A. Maurer
BY C. G. Stratton
ATTORNEY

United States Patent Office 2,998,313
Patented Aug. 29, 1961

2,998,313
METHOD AND MEANS FOR PRODUCING
ANIMATED CARTOONS
Norman A. Maurer, 3100 Cavendish Drive,
Los Angeles 64, Calif.
Filed Jan. 17, 1955, Ser. No. 482,281
12 Claims. (Cl. 96—44)

This invention relates to a method and means for producing animated cartoons and more particularly for producing such animated cartoons or drawings by using primarily standard motion picture cameras as differentiated from the existing manual methods in which such animated drawings or cartoons are produced by artists who make such drawings by hand.

Before proceeding with the description of this invention, it is fitting to describe here briefly the existing methods for producing animated cartoons or motion pictures. The existing method consists of manually making a very large number of pencilled outline drawings which must be gone over using black ink, these final drawings being made on cellulose acetate clear sheets known as "cells" (10" x 12" sheets of clear cellulose acetate), with the result that all objects and a background which are to appear in a cartoon are first outlined as black line outlines on these cells. Each individual frame of a motion picture is hand drawn and each successive picture is also hand drawn so as to represent the desired movement or change in position of the animated objects and, at times, of the background. An utmost degree of care must be exercised in each individual drawing so that the successive motion picture frames match the preceding and the following frame for avoiding any vibration of the animated subject on the screen upon the projection of the motion picture. Moreover, all the movements or changes in the position of the objects must satisfy the same requirements so that a reasonable degree of realism would be present in such movements. Tremendous amount of time is spent by the artists on analyzing the overall effects or results produced by any even simple movement on the entire body of the photographed object to create a realistic picture of such movement.

It is obvious that such manual techniques impose literally an insurmountable burden on the draftsmen or cartoon illustrators in order to produce an acceptable end product. It is very well known in the motion picture cartoon industry that it is impossible to produce cartoons which approach or resemble that degree of perfection which is present in ordinary motion pictures where human beings or other animated objects are photographed in conventional motion pictures, by using motion picture cameras. In this latter case a sufficient number of frames per second is exposed by the camera so as to satisfy the requirements imposed by the persistence of vision of a human eye.

As an example of the magnitude of the work imposed upon the animated cartoon artist in the production of present day animated motion pictures, it is only necessary to state that approximately 14,000 individual, different drawings, corresponding to the individual frames on the film, are required for producing an animated cartoon motion picture lasting 10 minutes when the latter is exposed through a standard motion picture projector.

Although the tremendous difficulties that are encountered with the present day animated cartoon techniques should be quite apparent from what has been stated above, it should be also stated here that the magnitude and the scope of the difficulties and limitations and the enormous expense involved in producing such motion pictures would not be complete if one were not to state that it is possible to produce such cartoons only with very simple drawings. In other words, the outline of the animated objects must be as simple as possible because of the above difficulties. Accordingly, although it has been greatly desired to produce animated films with realistically drawn or illustrated characters, it was economically and commercially impossible to produce such animated films.

Accordingly, the present methods have the following limitations: They are very costly; they consume a large amount of time; they require highly skilled animated cartoon artists; only objects having very simple outlines are desirable for animation; and finally, the end product is far from being ideal and realistic because of the impossibility of making optically accurate successive drawings and sufficient number of drawings for satisfying the requirements imposed by the persistence of vision of a human eye.

It is the purpose of the disclosed method and means for producing motion picture cartoons to eliminate practically all of the above difficulties and limitations by evolving photographic and film treatment techniques which permit the production of the animated cartoons with the aid of motion picture cameras and special film processing techniques, the end product of which is a realistic motion picture which is as realistic and optically perfect as the conventional motion pictures. The animation is obtained by using any animated objects such as human beings or animals and photographing them with standard motion picture cameras at the present standard film speed, i.e., 24 frames per second. Let us assume that the animated object is a human being. It is first necessary to apply to the person to be photographed certain types of makeup. When only one person is to be photographed, this makeup would be white in color so as to be reproduced on the film in the camera as a dense black negative upon the development of this film. This white color makeup is achieved by completely dressing the person to be photographed in white clothing and by applying a white makeup to all exposed skin areas. Then, by using a dull black ink or paint, certain key lines are painted on the costume and the makeup. These lines may be used for outlining belts, coat buttons, tie, etc. In addition, certain other key lines are painted on the figure in an artistic style such as eyebrows, nostrils, cheek lines, face wrinkles, etc. All of the above key lines, or painted black areas (on white costume) will be reproduced simultaneously with the reproduction of the object enabling an accurate outline reproduction of ties, belts, buttons, eyebrows, etc. The figure is then placed in front of a black non-reflecting background, such as black velvet, and the arrangement of studio lighting is adjusted so as to render the "flattest" possible illumination so as to make the photographed person appear as a "flat object" free from shadow. The person then performs all the necessary animations and movements in front of the non-reflecting background and such animations are photographed by using a standard motion picture camera and a high contrast film with a high resolving power. The film then is developed to produce a negative. The negative is then registry printed to produce a positive print film; such registry printing is obtained by using registry or stop-printing machines which are in common use in motion picture industry. Both the negative as well as the positive, or only the negative or only the positive, are bathed or "etched" in an etching solution for slightly enlarging the outline of the positive or for slightly reducing the outline of the negative. The positive and the negative films are then bathed in a photographic intensifier to bring the density of the dark areas back to the density of the original film prior to the "etching" step. The negative and the positive are now placed in register with each other and a photographic print is made; or, in a modified method, an enlargement is made. This print or the enlargement reproduces the subject only in an outline form and on a clear or transparent background. This positive print is subsequently used in connection with appropriate background drawings for producing an animated cartoon in the manner which will be described more fully in this specification.

From the above introductory description of the process it follows that all animations appear in as realistic a manner as in ordinary motion pictures except in an outline form, which gives the illusion that they are drawn by hand. The resulting outlines do not require any human effort and manual making of thousands of drawings required by the known and presently used method for producing animated cartoons.

It is, therefore, an object of this invention to produce motion picture cartoons with the aid of motion picture cameras and chemical treatment of the photographic film.

It is an additional object of this invention to produce motion picture cartoons having that degree of perfection, precision, and sequential accuracy and smoothness which is presently available with standard motion picture films utilizing animated three-dimensional objects or subjects, as differentiated from two-dimensional, flat drawings.

Still another object of this invention is to produce animated motion picture cartoons by using animated objects.

Still another object of this invention is to produce animated motion picture cartoons by obtaining a black outline representation of such object on the individual frames of a motion picture film by utilizing standard motion picture cameras and special film processing techniques for obtaining such outlines.

For a better understanding of the invention reference is made to the accompanying drawings in which.

Figures 1, 2, 3, 4:
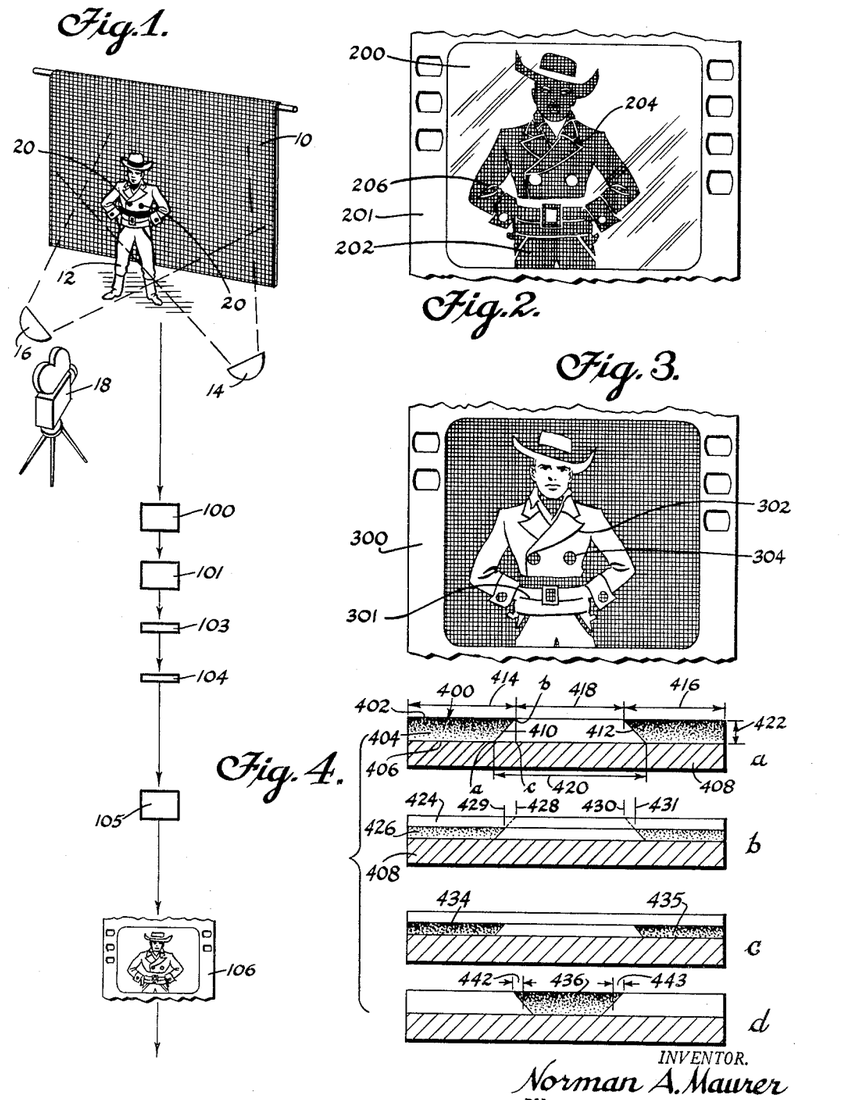
FIGURE 1 is a flow diagram of the method.
FIGURES 2, 3, 5 through 8, 12, and 13 illustrate individual frames of a motion picture which are produced in the course of the disclosed process of making animated cartoons.
FIGURES 4, 9, 10, 11, 14, and 15 are explanatory figures for better understanding of the method.

Referring to FIGURE 1, it illustrates a non-reflecting background screen 10; a suitable material for this screen is black velvet or any other type of flat dark or black, non-reflective surface, if it is decided that the animated object 12 to be photographed is to have a white makeup. The photographed object is then reproduced on the film, upon its development, as a dense black negative image on a clear background. It should be understood, that the above selection of the colors for the screen and the makeup may be reversed, in which case person 12 would have a black non-reflective suit and makeup with some white key lines, and screen 10 would be a white, non-reflective (i.e., matte) screen. It also should be mentioned here that for illustrating the basic principles of this invention and in order to simplify its understanding, the invention will be described by using only one animated person such as person 12. However, it should be understood that the invention is also applicable for making animated cartoons with several animated persons simultaneously appearing before screen 10. Black or white makeup and costumes can be worn by several persons appearing before screen 10 simultaneously as long as these several persons are physically separated or spaced from each other as viewed by the camera. Partial overlapping is possible but it will require subsequent manual touch-ups for restoring the partially blocked-out outlines or by filming each subject separaely and then combining them onto one film by the methods described in this application. However, when it is necessary to photograph one figure in front of a second figure and avoid the necessity of manual touch-ups with the two figures partially overlapping or covering each other, as viewed by the camera, it becomes necessary to resort to a special type of photography and use two different cameras and two different color makeups applied to the subjects, one color makeup coinciding with one filter of the optical system in one motion picture camera while the other color makeup corresponds to the color filter used in the second optical path of the second motion picture camera. The combination of colors, lighting and film in the latter case may include a photographic process using lighting outside the visible wave length of the spectrum, such as ultraviolet portions of the spectrum or infrared portions of the spectrum.

Reverting once more to FIG. 1, the lighting is represented diagrammatically by two lighting fixtures 14 and 16 positioned between object 12 and motion picture camera 18. In actual practice more lighting structures or light sources will be used so as to avoid the appearance of any shadows on the object. The above lighting requirements may be qualified here by saying that it is not vital to the proper practicing of the method to have a completely shadowless illumination in which the photographed figure is illuminated from all directions. However, it nevertheless is true that the end result is considerably enhanced if the object is illuminated evenly from all directions. This will become more apparent from what appears later in this description.

Camera 18 is a standard motion picture camera using 35 millimeter film with a high contrast emulsion and having a high resolving power. Suitable films of this type are Eastman "Micro-File" and Du Pont "Microcopy."

After person 12 is placed before screen 10, he is photographed in any desired sequence of action to produce a continuous motion picture negative of such action.

The exposed film is then developed by using known motion picture developing techniques for the negative film. It is preferable to select a developer which is designed to render maximum contrast and maximum density in the resulting image. If the Eastman "Micro-File" film is used, a suitable developer for such film is the Eastman "D–11" developer. The developed negative film will represent a series of silhouettes of the figure in varying positions corresponding to the actions or movements of person 12 during the exposures. The silhouette of person 12 will be black when white makeup is used and black background is used for screen 10. This background will appear as a clear or transparent film on the developed negative. Any key lines, which were previously painted as black lines or any areas such as pockets, buttons, etc. which also were painted black, will also appear as clear or transparent areas surrounded by the black image of the person. It should be noted here that some of these outlines need not necessarily be painted black so as to cover the entire areas of any particular portion of the costume worn by person 12. For example, buttons 20 may also be represented by painting only the circumference of the buttons with black paint. However, the key lines should be of sufficient width or thickness so as to register to a sufficient extent on the negative. In many cases it is desirable to use grey paint producing grey lines. For example, such paint may be a paint using approximately 70% of black substance. A 70% black line will produce a 30% black line on a negative. This line will print as a 70% black line on a positive. Subsequent etching of the negative will etch out completely the 30% black line. Etching of the positive will cause the fine line having 70% density practically to vanish, thus eliminating the "core" in the center of the lines. Thus 70% black is desirable on fine lines on the subjects and 100% black on larger areas where an outline is desired around said object-such as a button that is all black on the subject.

The developed negative, which will be called here the master negative, is illustrated in FIG. 2. Examination of this figure discloses the fact that in this case the background 200 is a clear transparent film and the image 202 of the photographed person appears as a black image. This image has a plurality of key lines such as 204, 206, etc., which appear as clear transparent areas surrounded by the dense black image of the object. It has been already stated that the above relationship of light and dark areas may be reversed, in which case the transparent background 200 of FIG. 2 would become black and the photographed image 202 would become transparent. For making this description consistent the entire process from here on will be described with the person wearing white makeup and screen 10 representing nonreflective black surface, as illustrated in FIG. 1.

Using registry motion picture film printing equipment the master negative 200 is now photographically printed on the same type of film as that used for photographing the object. The registry printing may be a contact printing or an optical projection printing, both of which are currently used in the motion picture industry. The printed master positive 300, FIG. 3, it then developed using the same developing techniques and developer formula as those which were used for processing the master negative. The resulting film print is, of course, the exact duplicate of the original negative except that the dark and clear areas are reversed as illustrated in FIG. 3.

Figure 8:
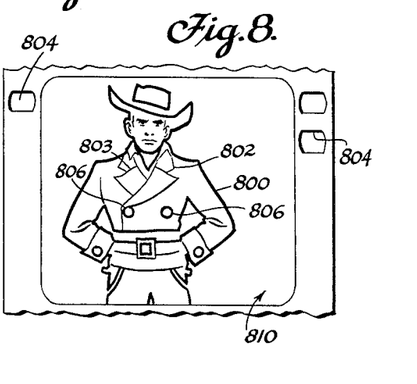

The basic principle of the disclosed method for producing dark line positive of the type illustrated in FIG. 8 is predicated on the fact that if one is to take a vertical section of the master positive illustrated in FIG. 3 and magnify the cross sectional view of this positive, then the developed silver grains in the emulsion portion of the film will have the appearance as that illustrated at 400 in FIG. 4a. The silver grain density will be maximum next to surface 402 of the emulsion layer 404 and it will be progressively decreasing as one recedes from surface 402 and approaches a junction 406 between the emulsion layer 404 and the cellulose acetate film base 408. Moreover, and what actually makes the disclosed method possible, the boundary lines 410 and 412 between the exposed portion 414 and 416 of the emulsion layer which received large amounts of light and portion 418 which did not receive any light or hardly any light, may be represented as two sloped lines 410 and 412. Accordingly, that portion of the emulsion which did not receive any light becomes progressively wider as one approaches the film base 408 and it is quite obvious from the examination of FIG. 4a that dimension 420 is considerably larger than dimension 418. It should be noted that a certain amount of light may have been received by a triangle abc, but the amount of this light and reduced amount of development received by triangle abc produces a density gradation illustrated in FIG. 4. This density gradation, for the purpose of the disclosed method, may be considered here, as an approximation, and that triangle abc is a clear, unexposed gelatin. For a more detailed description of this phenomenon, reference is made to chapter 13, and especially FIG. 13.24, page 257 of a book by T. H. James and George C. Higgins on "Fundamentals of Photographic Theory," John Wiley & Sons, N.Y., and C. B. Neblette, F.R.P.S., F.P.S.A. (Rochester Institute of Technology), "Photography, Its Materials and Processes," Van Nostrand, 5th edition, chapter 20, pages 309 through 317.

In the light of the discussion in the above publications, which hereby are made a part of this disclosure for making this specification complete, it follows that the disclosed method can not be practiced by using all types of photographic emulsions, but can be practiced only with the emulsions having high inherent contrast characteristics, low photographic turbidity, low or fine granularity of silver grains, and with concomitant very high resolving power. An example of the films having the above properties are the films especially designed for photographing documents such as Du Pont's "Micro-copy" and Eastman Kodak's "Micro-File."

As stated in the above publications, in the high contrast fine grain films high density and high uniformity of the silver halide grains causes an exposed area to diminish as one progresses from the outer surface of the gelatin emulsion toward the base of the film. Moreover, low photographic turbidity which is typical of these emulsions hardly causes any scattering or division of light beyond the emulsion path. When such film is developed, the silver halide grains which received maximum exposure, according to the present explanation of this phenomena, may act as catalysts for producing the development of adjacent silver grains; with the result that there will be a slight enlargement of the image next to the surface of the emulsion, i.e., that portion of the image which received the maximum amount of light. As one progresses from the outer surface of the emulsion towards its base, the effect of the developer on the grains and also the effect of these grains on the adjacent grains will be progressively diminishing with the concomitant result that the boundary line of the image can be approximated by the sloped lines 410 and 412 illustrated in FIG. 4a.

The above characteristics, which are desirable for producing optimum results in the disclosed method, are most pronounced in the emulsions used in the "Micro-copy" and "Micro-File" emulsions. It will be understood by those skilled in the art, however, that it does not follow from the above that this method is restricted only to the specifically mentioned films such as "Micro-copy" and "Micro-File"; since fair results can be obtained even with standard emulsions where the same phenomenon is also present except to a lesser extent. Accordingly, the above specification of the emulsions should be regarded here as a disclosure of the best mode of the operation of the method rather than its restriction to any specific given emulsion.

An examination of FIG. 4a at once reveals the fact that if the metallic grains of silver are dissolved or removed by some means, then there will be a widening or slight enlargement of the clear portion of the positive. This widening or enlargement of the clear portion will be a function of the dissolved or removed layer of the metallic silver from the emulsion layer 422; the thicker is the removed layer of silver, the more pronounced is the enlargement of the clear portion. Accordingly, the degree of the enlargement may be controlled very precisely and very effectively if some effective methods are available for controlling precisely the degree of the removal of the metallic silver layer. The methods for removing or dissolving the metallic silver actually do exist and are available at the present time and are known in the photographic art as the negative reducing processes. Such process consists of bathing the print in such solutions as potassium ferricyanide and sodium thiosulphate, the solutions being known in the photographic art as negative reducers. Reducers of this type have been and are being used in the photographic art for correcting the density of positives or negatives to some desired specific density for obtaining proper photographic images in the end product. Accordingly, prior use of such reducers has been for the purpose of obtaining proper aesthetic or artistic rendition or reproduction of images rather than for changing the size of such images, which is the case in the disclosed method. The action of such reducers is very well known in the photographic art and need not be described here. Suffice it to say that the developed silver grains are dissolved by using inorganic salt solutions, which are capable of changing metallic silver into silver ions which then enter the solution and leave the gelatin emulsion. One of the suitable solutions for obtaining such dissolving of the metallic silver is as follows:

REDUCER R-4a

*Stock solution A*

Potassium ferricyanide ___________________ 37.5 grams
Water to make ___________________________ 500 cc.

Stock solution B

Sodium thiosulphate _____________________ 480.0 grams
Water to make ___________________________ 2.0 liters For obtaining a reducer suitable for use as contemplated here, add 15 cc. of stock solution A to 120 cc. of stock solution B. Then add water to make one liter. Use this way and do not dilute.

The actual method of etching or reducing is performed as follows:

The developed, rinsed, or washed negatives and their positives are immersed in a wetting agent whose formula is as follows:

The Eastman Kodak Photo-Flo solution, a commercially available solution whose exact formula is not available.

This wetting agent is used for obtaining more uniform dissolving of the silver grains from the emulsion layer. Accordingly, it aids in producing more uniform results and facilitates the control of the amount of etching or reduction produced in the positives and negatives. Accordingly, it may be regarded in the overall method as a desirable step which facilitates the practicing of the disclosed method, but which may be considered at the same time as a step which is not absolutely essential for practicing the method.

The films are held in the wetting agent for approximately 30 seconds, whereupon they are rinsed for approximately 30 seconds and then immersed into the reducing or etching bath described previously. This bath may be maintained at a temperature of 68° F. With the concentration of the solution as given above, a sufficient amount of etching is obtained in approximately 5 to 10 minutes, depending upon the width of the outline line desired in the end product. It is quite obvious that the longer the period of etching, the wider will be the final outline line. The above etching step can be controlled quite readily by controlling the temperature of the etching bath, its concentration, and the amount of time the film is retained in the etching bath. Accordingly, this step is not critical because the concentration of the etching solution can be always reduced to such an extent as to make the amount of time required for producing such results sufficiently long to make this step non-critical. It has been mentioned above that the desired temperature for the reducing bath is 68° F. This temperature is the temperature which is generally recommended for reducing bath and all other photographic baths well known to most photographic art. Accordingly, this temperature does not differ from those generally used in the photographic art, and can be varied between the approximate limits such as 65° to 70° F., which limits are generally considered to be best for producing optimum results on a gelatin emulsion.

It obviously should be kept in mind that sufficient amount of silver grains must remain in the emulsion so as to produce an image of sufficient opacity or density in the subsequent intensification or dyeing step, which is described below.

Other reducing agents which are also suitable for obtaining the sought results, are such reducing agents as Eastman Kodak's reducers R–4b and R–15, whose chemical formulas may be found on pages 59, 60 of Eastman Kodak Data Bk., Processing and Formulas.

In the photographic art reducers are classified broadly into three classes:

(1) Cutting reducers
(2) Proportional reducers
(3) Super proportional reducers

In the disclosed method the images of the object on the negative as well as on the positive are represented by large areas which have very high density areas and practically clear areas. This being the case, any one of the above types of reducers is suitable for practicing the disclosed method, and the only qualification that may be mentioned here is that some of the key lines which may be painted grey will disappear on the positive, such as positive 300 illustrated in FIG. 3, more readily if a cutting or subtractive reducer is used rather than the super-proportional reducer. Accordingly, to some extent the selection of the reducer may be controlled primarily by the effects which one may wish to produce with respect to any internal lines or images which are produced within the outline of the image. In the ordinary photographic art the selection of the reducers is primarily controlled by the photographic mistakes which one wishes to correct on the positive or negative in the course of the reduction. It is obvious that if any similar errors do occur in the positives and negatives such as those illustrated in FIGS. 2 and 3, the same purely photographic mistake correcting considerations will be applicable to the disclosed method.

The effect of the reducing or etching step on the emulsion layer 400 is illustrated in FIG. 4b. Examination of this figure discloses the fact that the silver grains have been removed from upper layer 424 with the result that only a thin layer 426 retains the silver grains, this layer being adjacent to the film base 408. The vertical lines 428, 429, 430 and 431 indicate the amount of widening or enlarging of the clear portion of the film that is produced by the previously described etching process. As previously mentioned, since the amount of etching can be controlled with high degree of precision by controlling the concentration of the solution, its temperature, and time of exposure; it also follows that the degree of widening of the clear image can also be controlled with the same degree of precision. It is this widening of the clear image that determines the thickness of the outline line in the final product as will appear more clearly from the description that follows. However, it is proper to mention even at this stage that as long as the etching can be controlled quite effectively the thickness of the outline line can also be controlled very effectively in the disclosed process.

The term "etching" is used here to convey the same meaning as "reducing," the latter term being used widely in its application to the photographic art and especially the reducing process described above; it is desirable to substitute a different term, etching, in this case to avoid confusion with the term "reducing" used in this specification to describe the reduction in size of the image, such as that illustrated in FIGS. 4b, 4c, and 4d. Accordingly, from here on, and in the claims, the verb "reduce" will signify the described change in size and not the change in the density of the photographic image.

Examination of FIGS. 4a and 4b discloses the fact that upon the completion of the etching step the remaining emulsion layer containing dispersed silver grains, or layer 426, does not have as high a density as the original layer 404, since the densest portion of the layer 404 has been removed during the etching of the emulsion. Accordingly, it becomes necessary to intensify this remaining portion 426 and impart to it a density which is equal to the original density of that portion of the layer which is next to surface 402. This is accomplished by bathing the etched film, FIG. 4b, in a photographic intensifier until the density of the dark area is brought back to the density equal to the density of the removed layer. Photographic intensifiers are well-known in the photographic art and their chemical composition and properties can be found in standard handbooks on photography. Intensifiers of the type meant here and instructions for their proper use are listed, for example on pages 55, 56, and 57 of the Eastman Kodak Data Book, "Processing and Formulas," 3rd ed., 1946. Intensifiers add silver to the image, or compounds of silver and other metals, such as chromium or mercury. In some intensification processes the mass of the silver deposit remains constant but its opacity is increased, in which case such intensification is called optical intensification. Perhaps the most effective intensification in the above family is the "chromium" intensification which is obtained, for example, with the Eastman Kodak Company's chromium intensifier known as IN-4 intensifier. This intensification is described on page 56 of the Eastman Kodak Data Book mentioned previously.

Although it is possible to obtain satisfactory results by using the above-mentioned photographic intensifiers, it is preferable to use a red dye such as aniline dye "Safranine A." For a more detailed description of the dyeing techniques of the above type reference is made to pages 65, 66 of Eastman Kodak Data Book more fully identified before in this specification. It should be understood that any existing formula for dye-toning an exposed portion of emulsion will give satisfactory results. Also, any color of dye may be used for obtaining dye-toning so long as the light-transmitting properties of the end product are such that the emulsion of the print film is insensitive to that portion of the spectrum which is transmitted by the dye-toned portion of the dye-toned positive or negative or both, since the dye-toning techniques are known to the photographic art. In view of the previously mentioned reference to the publication where such techniques are described in more detail, it is unnecessary to describe them here any further. It may be fitting only to mention here that in the dye-toning techniques of the above type, films are bathed in a mordanting bath, prior to their dyeing such as Kodak Mordant Bath T-17. This bath converts the silver image into inorganic compounds which cause the dye to come out of solution and precipitate on this compound. This causes the final silver image to be dyed while the clear areas and the base remain clear. Upon proper exposure to the mordant bath the film is removed, rinsed sufficiently to remove all traces of the mordant solution from the clear areas, but retain it in the silver compound layer whereupon the film is immersed into a dye solution such as Kodak Dye Bath T-17a tinted with Safranine "A" which dye tones red that portion of gelatin which retains the silver compound. Accordingly, when the negative or positive, so dyed, is printed or enlarged on a film of an orthochromatic or blue sensitive nature, using white light, the dyed portion of the positive or negative transmits only the red portion of the spectrum and since the orthochromatic or blue sensitive emulsion of the print film is insensitive to that portion of the spectrum the dyed areas will be reproduced on this print or enlargement as clear or unexposed areas.

The intensified image appears as layers 434 and 435 illustrated in FIG. 4c.

It may be mentioned here that it is necessary to intensify the etched films to restore the dark areas to that density which is suitable for obtaining a high contrast print. Accordingly, the intensification process must be carried out to the extent so that the density of the layers 434 and 435 should be such as to stop transmission of light through the layers 434 and 435. In an ideal case these areas are 100% non-transparent and it is obvious that the intensification step is performed effectively when this ideal is approached as closely as possible from a practical point of view. No inference should follow from the above, however, that the intensification step is a critical step in this process.

It is proper to revert here once more to that modification of the method in which screen 10 is white and object 12 is black. In such case, the clear and the dark portions of the print are reversed as illustrated in FIG. 4d. In this case the etching reduces the size of the dark image 436 by such amounts as 442 and 443 illustrated in FIG. 4d. As in the prior case, such image obviously will have to be intensified in the manner described previously in connection with FIG. 4c. The same is also true of the negative 201, FIG. 2; in other words, it is also possible, as mentioned before, to etch the negative in which the dark image has a geometry as that illustrated in FIG. 4d.

It has been previously mentioned in the specification that the master negative 201 as well as the master positive 300 both may be subjected to the etching and dyeing processes. The results of such etching and dyeing are obvious from the examination of FIG. 4. In such case, the clear areas of the positive are uniformly enlarged in the manner illustrated in FIGS. 4a through 4c, and when negative 201 is etched, then its dark image is reduced in the manner illustrated in FIG. 4d. In other words, when the positive as well as the negative is etched, the desired difference between the size of the master negative and the size of the master positive for obtaining the outline line is obtained by slightly enlarging the size of the positive image and by slightly reducing the image on the master negative. The advantage of etching the negative as well as the positive resides in the fact that in such case the amount of etching and the amount of the subsequently required intensification are reduced. However, it has the disadvantage of processing the two films during the etching as well as the intensification process. As a rule, the best results are obtained when the master negative as well as the master positive are both etched. In this case, the key lines such as lines 301, 302 on the positive are etched away altogether during the etching of the positive, because of their relatively faint densities, whereas the transparencies 204 and 206 on the negative are slightly increased in their size. Therefore, when the negative and the positive are superimposed upon each other in the later step of the process, and printed, then the key lines are reproduced as black lines (see FIGS. 7 and 8) without any white or clear, transparent "core" surrounded with the black line, which would take place if the key lines 301 and 302 were not sufficiently eliminated during the etching step. Moreover, the small black circles such as 304 representing buttons in FIG. 3 are not etched away altogether when the negative as well as the positives are etched, because in such case, etching of the master print is not as drastic as that which would be required if only the master positive were to be etched. It nevertheless, should be added here, by way of the summary of the above, that either a negative or a positive or both can be etched with satisfactory results depending upon the type of the photographed object. When a large number of key lines is present then etching of the master negatives and positives is preferable even though it entails the processing of the two films.

Figure 5:
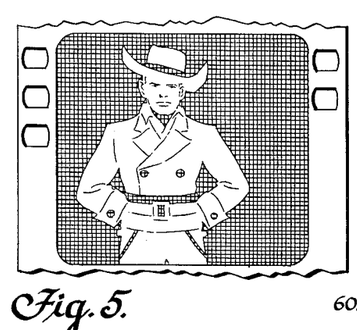

The etched master positive is illustrated in FIG. 5. If the frame appearing in FIG. 5 would be superimposed upon that appearing in FIG. 3 then it would be discovered that the white figure represented on the frame in FIG. 5 would be slightly larger in size than that represented in FIG. 3, due the previously mentioned etching. No corresponding frame is illustrated in the drawings to indicate the appearance of the master negative after it is etched but it follows from the description given previously that the size of the black areas in FIG. 2 is reduced.

Figure 6:
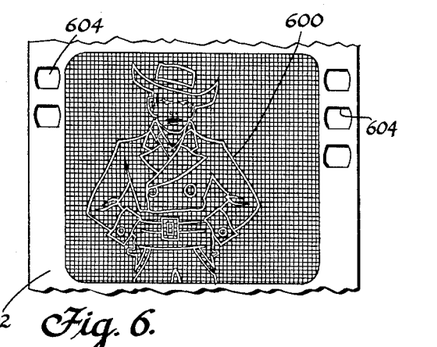

After the completion of the intensification, washing, and drying of the master positives and master negatives, the two films are placed in proper register with respect to each other and secured together. The appearance of a single frame of the superimposed master positive and master negative is illustrated in FIG. 6. Because of the slight enlargement of one image and slight reduction of the size of the other image, superimposition of the two films upon each other will result in a transparent image outline 600.

Figure 7:
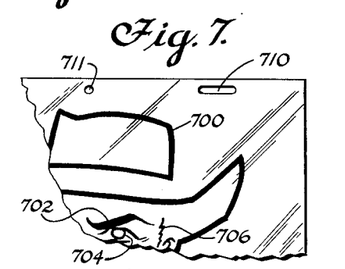

This composite film is then used for making individual frame enlargements by using a photographic enlarger. It is obvious that the two films must be maintained in proper register with respect to each other to produce the outline line positive. Such proper register can be accomplished very readily by using an intermittent precision movement, identical to the movements used in motion picture cameras, projectors, and registry printers. The alignment is obtained by means of a pressure pad, that locks the film on two registry pins, and a claw also having two pins that transport the films (two films in this case) one frame. The enlargements are made on a print film with an orthochromatic or blue sensitive emulsion, white light being used in the enlarger as a source of illumination as described previously in this specification. Only the clear or white light areas are reproduced on the final print film. The enlargements are developed, rinsed, and dried. The photographed object appears as a dark line 700, FIG. 7, outlining the silhouette of the entire photographed object 12 shown in FIG. 1. It also has the inner key lines such as 702, 704, and 706. Only a small portion of the entire image is illustrated in FIG. 7 because of its enlarged size. Any suitable enlargements may be used such as 5" x 7", 8" x 10", 10" x 12", or 11" x 14", the 10" x 12" enlargement being standard animation dimensions presently used in the animation industry. Suitable films for making the enlargements are high contrast graphic arts films such as Ansco "Repolith" or Du Pont's "Photolith," which are orthochromatic films sensitive to all light wave lengths except red. These films give excellent results because of their extreme contrast, because the colored antihalation dyes present in orthochromatic films completely vanishes and thus no change in tone is present when the enlargements are placed over a background and also their surfaces readily accept ink lines for touchups. These enlargements are then used for producing the individual frames of the motion picture by touching up the photographically produced outline of the object and the key lines. Whenever full color animated cartoons are desired the colors are also introduced onto this enlargement. These individual frames are then placed in front of or over a suitable background and photographed in sequence for producing the 35 millimeter full color animated cartoon motion picture. The amount of manual touching up necessary for producing an aesthetically pleasing final product is very limited.

FIGS. 8 through 12 illustrate an alternative process of obtaining the final print having the background as well as the photographically produced outline of the photographed animated object. In this case the composite film including the etched positive and the etched negative are superimposed in register upon each other and printed onto a third film by optical printing methods. This third film need not be of the same type high resolving-high contrast film as the negative and positive films as it will undergo no treatments in etch or dye, and therefore, a standard high contrast motion picture release print film can be used, such as Eastman-High Contrast Positive Safety, type 5363. In this printing operation it is preferable to use the optical projection registry printing method, well known in the motion picture art, rather than the contact printing method. The aperture of the projection lens is closed down to increase the depth of focus which produces sharp focusing and projection of both films onto the printing film and insures sharpness of all lines. It should be noted here that it is necessary to "match" or superimpose the images of the master negative and positive in proper manner to obtain proper register of the two images in the projection printer. Experience indicates that the film perforations 604 and 804 are positioned with such great precision in the films and the intermittent film movements and sprocket registry pins in the motion picture cameras and printers are made with such great precision that the master positive and the master negative frames retain their proper alignment with respect to each other even though they are not joined by any physical means such as cement. The film exposed to the composite films 602 is developed in the developers suitable for the high contrast film, which were mentioned previously, washed and dried and this produces the outline line positive illustrated in FIG. 8. The outline line is line 800 which faithfully outlines the originally photographed object 12, FIG. 1. The key lines 802, 803 and the buttons 806 also appear on the outline positive in proper thickness and, therefore, give the necessary inner lines for completing a pleasing aesthetic appearance of the photographed art.

The steps of the process described thus far are illustrated in the form of the flow diagram in FIG. 1 where it is indicated that the process begins with the photographing of object 12 for obtaining the master negative 100. The latter is used for obtaining the master positive 101 which is followed by the etching and intensifying steps 103 and 104. The master negative and positive are then superimposed on top of each other in an enlarger for producing enlargement illustrated in FIG. 7, or the two are superimposed on top of each other in a projection printer and projection printed on a 35 mm. high contrast print film. This is illustrated at 105. Subsequent development of the print film produces the outline line positive 106 corresponding to that illustrated in FIG. 8.

The above steps complete the process for obtaining the outlines of the animated objects with the aid of standard motion picture camera 18, FIG. 1, the special etching and intensifying steps, and printing techniques used in motion picture industry.

As a rule it is not enough to produce the outline sequences of a moving object against a transparent background, an example of which is illustrated in FIGS. 7 and 8. It generally is necessary to supplement the above with an appropriate background so that the final product would appear as that illustrated in FIG. 13. The steps for introducing such background are illustrated in FIGS. 9 through 13, and also FIGS. 14 and 15, which will be described below.

The method of introducing the background in connection with FIG. 7 need not be described here any further, because it constitutes a standard method, well-known in the cartoon industry. Suffice to say that the background is introduced by combining or placing the enlargement on top of the background drawing and photographing the two in a composite picture. The composite picture is photographed one picture or frame at a time, by using motion picture stop cameras. Proper registering means 710 and 711 are used throughout so as to have the enlargements and the background in proper position with respect to the optical axis of the camera. This is generally accomplished by having proper register pins on a mounting board used for holding the composite picture which have perforations 710 and 711 in them for mounting them on these pegs. These perforations are placed in the film with great precision prior to making enlargements to insure proper alignment of all elements to produce the individual frames of the motion picture negatives.

Figure 9:
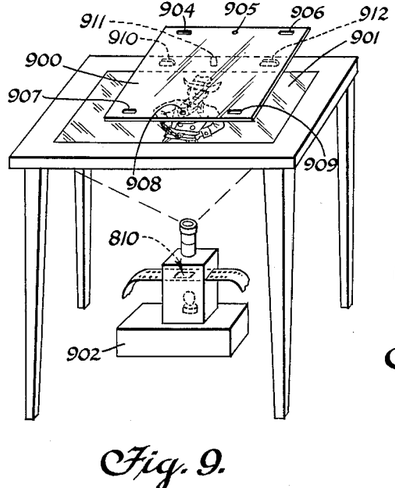
Figure 10:
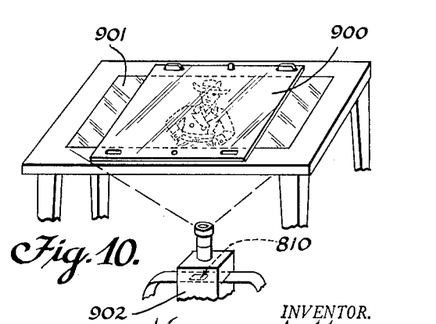
Figure 11:
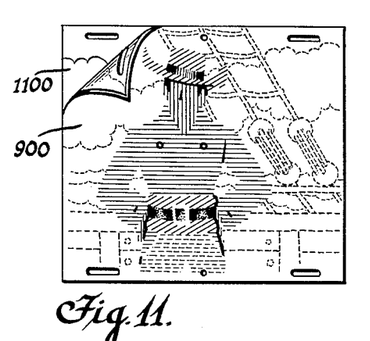
Figure 12:
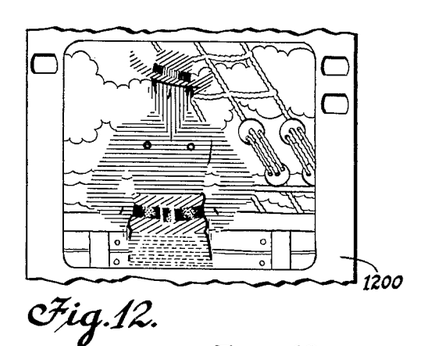
Figure 13:
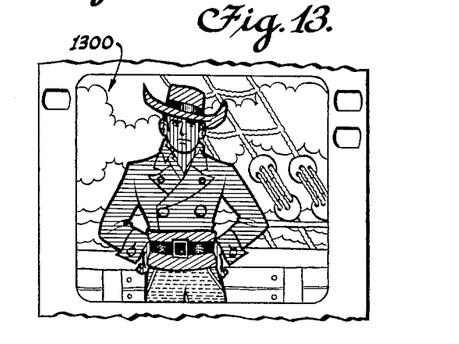

The second method of introducing the background, illustrated in FIGS. 9 through 13 is obtained as follows:

A clear cellulose acetate sheet 900 is placed on top of a ground glass plate 901, and the outline positive 810 is projected on the ground glass 901 by using a projector 902. All touch-up corrections are made by an artist by using black ink on the clear acetate plate 900 provided with alignment perforations 904, 905, 906, 907, 908, and 909 which fit over alignment pins 910, 911, and 912. The acetate plate 900 is then reversed and again placed on top of the ground glass plate 901. Positive 810 is also reversed in projector 902 and projected on ground glass 901. Opaque colors or tones are now applied to the desired areas using the projected line outline of the object as a guide in applying such colors or opacities. The cellulose acetate drawing 900 is then placed in front of the background drawing 1100 as illustrated in FIG. 11 and the opaque form of the subject covers that area of the background drawing which is directly behind the subject, leaving the rest of the background exposed to the view.

The superimposed cellulose acetate drawing or "cell" and the background drawing are then photographed either on color or black and white film by using a 35 millimeter motion picture stop camera. Suitable films for this purpose are any standard motion picture film stock. This photographing step is performed so as to reduce the combined picture of the background and of the apaqued and touched-up object to the exact size and proportions of the object as it appears on the outline positive 810. Upon the development, the resulting film negative is printed to obtain a positive 1200 illustrated in FIG. 12. It can be seen that the entire background, except that portion of it which has been blocked by the object, appears in this picture and the object itself also appears in this picture in the form of touch-up lines and also colors or opaque areas which prevent the reproduction of the background directly behind the object. This intermediate positive is obtained by using motion picture printing techniques. This intermediate positive is then superimposed on outline positive 810 and these two combined positives are used in a registry printer for producing a master combination negative (not illustrated) which is eventually used for producing the positive 1300 illustrated in FIG. 13. This master combination positive 1300 has the background as well as the full reproduction of the object including the outline lines 800 and all the key lines contained within the outline of the object. It is this combination positive that is eventually used in the projection rooms of theatres for producing animated cartoons on the screen.

Figure 14:
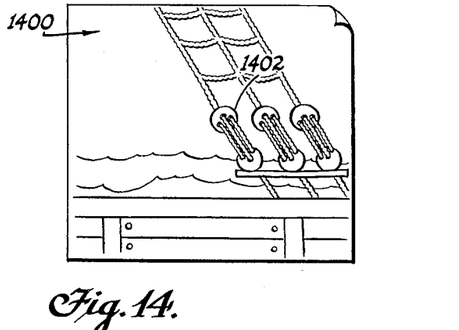
Figure 15:
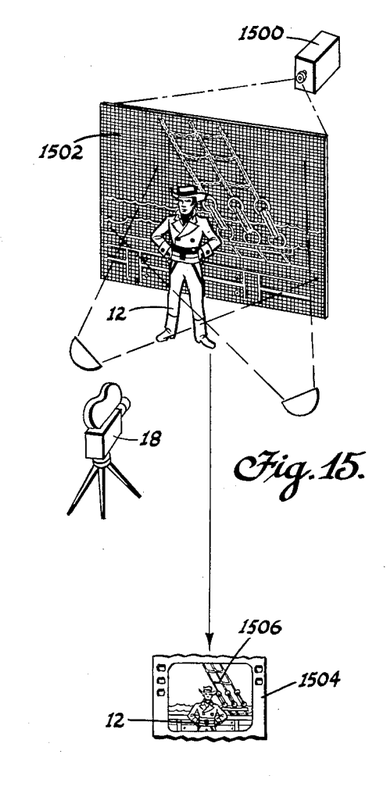

FIGS. 14 and 15 illustrate an additional available method for introducing background onto the animated cartoon film. In this instance a background drawing 1400, FIG. 14, is made and is photographed on a 35 mm. film or larger size film if the background is stationary. The resulting negative is then placed in a projector 1500, FIG. 15, and the projected negative reproduces the image of the background on a rear projection screen 1502 in accordance with the methods well-known to the motion picture art. The object is then photographed in front of the rear projection screen 1502 in the same manner as in FIG. 1. The remaining steps for producing the outline line positive such as 106, FIG. 1, in this case are identical to those in FIG. 1 and, therefore, need not be described further. The resultant outline line positive in FIG. 15 is illustrated at 1504. It has the same object 12 reproduced on the positive and in addition to the object 12 the same positive also has a background 1506 corresponding to the background 1402 appearing in the original drawing.

Whenever it is necessary to create an illusion of movement of the object with respect to the background, a long sheet drawing, representing various portions of background, is drawn and various portions of this long sheet of background drawing is photographed by using a motion picture camera, moving the camera from one end of the drawing to the other at any desired speed. The background negative film is then projected through the same projector 1500 which now must be synchronized with the motion picture camera 18, FIG. 15, which is used for photographing the object. The object then in turn synchronizes his movement with the appearance of various background portions on the rear projection screen 1502.

The disadvantage of the latter method of introducing the background directly onto the film resides in the facts that:

(1) It is not economical to use this method with color film.

(2) One cannot get shaded backgrounds.

(3) The touch-ups are rather difficult to make on a small size film.

(4) The end result, from the standpoint of the appearance of the quality of the art work, is not as good as in the first two methods.

If one is to compare the three disclosed methods for obtaining background, it is obvious that the method described in connection with FIG. 7 will produce the best results. The enlargements of the final prints illustrated in FIG. 7 are used here in the final remaining steps of the process as the well-known "cells" used extensively in the making of animated motion picture cartoons. The size of these enlargements or cells is such that from then on the touch-up procedures and the introduction of the background can be done quite effectively by an artist which produces a high grade final film. The results obtained by the second method such as that illustrated in FIGS. 9 through 13 also produces good results. The limitations of the third method, namely, that illustrated in FIG. 15, have already been outlined above and need not be repeated here.

The disclosed method and means of producing photographically an outline of a moving object for an animated cartoon have been disclosed here by disclosing a method which utilizes a master negative as well as a master positive such as those disclosed in FIGS. 2 and 3. The master positive as well as as the master negative may be produced on the same film which has a base in the center, a first emulsion on one side of the base, and a second emulsion on the opposite side of the same base. The base is dyed so as to prevent exposure of one emulsion from simultaneously exposing the other emulsion. The emulsions are then exposed through a single lens and the image is optically split by prisms and then passes through different filters with the result that the image is reproduced as a negative on one emulsion and as a positive on the other emulsion. The double emulsion film is then etched in the same manner as described here in connection with FIG. 4. The advantage of this disclosed method resides in the fact that only one film is used for obtaining the composite image of the type illustrated in FIG. 6. While the method disclosed previously herein makes it necessary to use a master positive as well as a master negative, the disadvantage of the method that utilizes the master positive and master negative on opposite sides, of a film, resides in the fact that it requires a special camera and a special film for obtaining the same results. The above, nevertheless, illustrates the fact that the method disclosed in this application and its basic principles are equally applicable to a single film as well as to a two film process and the basic concept is generic to both cases, because both are predicated on the change of the size of the image in a manner disclosed in connection with FIG. 4.

It has been emphasized throughout this specification that best results are obtained with the disclosed process when high contrast, high resolving power emulsions are used. Although these emulsions have excellent characteristics insofar as the etching step of the process is concerned, their photographic speed is relatively low as compared to the regular motion picture stock films, such as Eastman Kodak "Super-XX" or "Plus X." Although these films are not suitable for the etching step, they are much superior for photographing the moving object because of their high speed. Accordingly, this method can be practiced in the following manner. The regular motion picture stock such as "Super-XX" or "Plus X" may be used for actual photographing of the object in the manner illustrated in FIG. 1. This enables one to photograph the moving object with an ordinary amount of lighting or intensity of illumination, because of the high speed of the photographic emulsion. Developing of this high speed film produces a negative and this negative then can be used for producing the duplicates, i.e., a positive as well as a negative on the high contrast, high resolving film for obtaining the master negative and the master positive illustrated in FIGS. 2 and 3. From then on these master positives and master negatives are used in the same manner as has been disclosed previously in this specification.

From the above description of the invention, it should not be difficult for those skilled in the art to understand and comprehend the advantages offered to the animated cartoon industry by this invention. All of the outline line images are optically perfect and their size and motion from frame to frame are equally optically perfect with the result that very complex moving objects can be reproduced in an outline form with the accuracy typical of the ordinary motion picture techniques, either black or white, or in color. This high quality photographic reproduction is not attained at a much higher expense, which is generally the case when better processes are disclosed. Quite on the contrary, in this instance, although the results are incomparably better than the results obtainable with a manual effort of the animated cartoon draftsmen, the disclosed method is much cheaper than the known method because it enables one to use standard motion picture cameras and films for obtaining the line outline of the animated objects. The latter eliminates a tremendous amount of the time consuming, high cost hand art work hitherto mandatory for the production of animated cartoons having a much smaller amount of quality than the disclosed product.

Having thus described the invention, what is claimed and desired to be secured by Letters Patent is:

1. In a method for producing an animated line image of a three dimensional object, the steps comprising making a negative of said object utlizing a high contrast motion picture film, said negative having exposed areas, making a positive from said negative utilizing a high contrast motion picture film, said positive having exposed areas of the same size as the exposed areas of the negative, chemically reducing the sizes of the exposed areas of one of said negative and positive by immersing it in a reducer bath, placing said negative and positive in registry in mutually contacting relationship, the differences in sizes of said exposed areas producing a transparent line image of said object, and making a photographic print of said negative and positive while maintaining said registry to produce an ultimate motion picture film wherein said object appears as a line image.

2. In a method for producing an animated line image of a three dimensional object, the steps comprising making a negative of said object, making a positive from said negative utilizing a high contrast motion picture film, said positive and negative having exposed areas, making a second negative from said positive utilizing a high contrast motion picture film, said second negative having exposed areas of the same size as the exposed areas of the positive, chemically reducing the sizes of the exposed areas of one of said positive and second negative by immersing it in a reducer bath, placing said positive and second negative in registry in mutually contacting relationship, the differences in sizes of said exposed areas producing a transparent line image of said object, and making a photographic enlargement of said positive and second negative while maintaining said registry to produce an ultimate motion picture film wherein said object appears as a line image.

3. The method of claim 2 wherein the object is photographed against a background, said background having light-reflective properties opposite to those of said object, and including the step of uniformly illuminating the object and the backgound to create a contrasting image of said object.

4. The method of claim 2 wherein the sizes of the exposed areas of both the second negative and positive are reduced.

5. The method of claim 2 wherein the size of the exposed areas of the second negative is reduced.

6. The method of claim 2 wherein the size of the exposed areas of the positive is reduced.

7. The method of claim 2 wherein the darkness of the reduced exposed areas is intensified.

8. The method of claim 2 wherein the reduced exposed areas are dyed with a dye having light-transmitting properties such that the emulsion of the ultimate film is insensitive to that portion of the spectrum which is transmitted by the dyed exposed areas.

9. The method of claim 2 wherein the reduced exposed areas are dyed with a red aniline dye and wherein the ultimate film has an emulsion insensitive to the red band of the spectrum.

10. The method of claim 2 wherein the object is photographed against a background, said background having light-reflective properties opposite to those of said object, and the reduced exposed areas are dyed with a dye having light-transmitting properties such that the emulsion of the ultimate film is insensitive to that portion of the spectrum which is transmitted by the dyed exposed areas.

11. The method of claim 2 wherein the object is photographed against a background, said background having light-reflective properties opposite to those of said object, and the reduced exposed areas are dyed with a red aniline dye and wherein the ultimate film has an emulsion insensitive to the red band of the spectrum.

12. In a method for producing an animated line image of a three dimensional object, the steps comprising making a negative of said object, said negative having exposed areas, making a positive print from said negative utilizing a high contrast motion picture film, said positive having exposed areas of the same size as the exposed areas of the negative, chemically reducing the size of the exposed areas of said positive by immersing said positive in a reducer bath, placing said negative and positive in registry in mutually contacting relationship, the differences in sizes of said exposed areas producing a transparent line image of said object, and making a photographic print of said positive and negative while maintaining said registry to produce an ultimate motion picture film wherein said object appears as a line image.

References Cited in the file of this patent

UNITED STATES PATENTS

| | | |
|---|---|---|
| 1,273,435 | Williams | July 23, 1918 |
| 1,416,154 | Ahbe | May 16, 1922 |
| 1,446,123 | Lederer | Feb. 20, 1923 |
| 1,725,395 | Fruwirth | Aug. 20, 1929 |
| 1,950,903 | Murray | Mar. 13, 1934 |
| 1,967,057 | Irvine | July 17, 1934 |
| 2,181,405 | Kosa | Nov. 28, 1939 |
| 2,618,554 | Zieger et al. | Nov. 18, 1952 |

FOREIGN PATENTS

| | | |
|---|---|---|
| 408,623 | Great Britain | Apr. 9, 1934 |

OTHER REFERENCES

Wall: Intensification and Reduction, pp. 17–18, 1927, Amer. Photographic Publ. Co., Boston, Mass.